3,401,189
TETRAMETHYL LEAD MANUFACTURE
Charles Anthony Sandy and Victor Tullio, Wilmington, Del., assignors to E. I. du Pont de Nemours and Company, Wilmington, Del., a corporation of Delaware
No Drawing. Filed Feb. 7, 1966, Ser. No. 525,355
5 Claims. (Cl. 260—437)

This invention relates to the manufacture of tetramethyl lead, and more particularly to its manufacture by reacting monosodium-lead alloy and methyl chloride in the presence of a hydroxyl amine as catalyst.

For many years, tetraethyl lead was the only motor gasoline antiknock agent of commercial interest. Therefore, the early workers in this art concerned themselves with developing processes for manufacturing tetraethyl lead. Although this early work was limited to preparation of the ethyl compound, it was alleged that these processes could be used to make all tetraalkyl lead compounds, assuming that all tetraalkyl lead compounds could be made in the same manner. These early investigators reacted ethyl halides, usually ethyl bromide, with sodium-lead alloys containing two or more sodium atoms per lead atom ($Na_2Pb$ or $Na_4Pb$) in the presence of a large amount of water, or its equivalent, which reacts with the excess sodium thereby releasing hydrogen and producing strong reducing conditions. Calcott, in U.S. Patent 1,559,405, and Midgley, Jr., in U.S. Patent 1,622,228, proposed the use of certain catalysts including amines such as pyridine, aniline, and butylamine, esters such as ethyl acetate, ether and ammonia.

In U.S. Patent 2,270,109, Calingaert et al. recognized that all tetraalkyl lead compounds cannot be prepared in the same manner. They state that tetraethyl lead was commercially prepared at that time by reacting ethyl chloride with monosodium-lead alloy (NaPb). They found that methyl chloride, alone or in admixture with ethyl chloride, does not react to any appreciable extent with monosodium-lead alloy except in the presence of certain metal catalysts, mainly aluminum type catalysts.

In U.S. Patent 2,535,190, Calingaert et al. found that improved yields can be obtained in the reaction of ethyl chloride with free lead or sodium-lead alloy if the reaction is carried out in the pesence of magnesium and certain catalysts including tertiary amines such as triethylamine. They also indicated that this process could be used to make tetramethyl lead, but stated that the excellent yields obtained with ethyl chloride are not obtained in the case of methyl chloride.

In U.S. Patent 2,635,106, Shapiro et al. disclosed that ethyl chloride can be reacted with a ternary potassium-sodium-lead alloy to produce tetraethyl lead, and that the yield is increased by the presence of certain catalysts including amines. It is stated that none of these catalysts improve the yield to any extent with monosodium lead alloy. They did not disclose or contemplate the use of methyl chloride or the production of tetramethyl lead.

In more recent art, the manufacture of tetramethyl lead is described by Jarvie et al. in U.S. Patent 3,048,610, Tullio in U.S. Patents 3,072,694 and 3,072,695, and Cook et al. in U.S. Patent 3,049,558 as posing difficulties not encountered in the manufacture of tetraethyl lead. These patents suggest that the $CH_3Cl$-NaPb system is unique since it requires catalysis, and that certain aluminum compounds are effective catalysts for producing tetramethyl lead. These processes, however, including present commercial processes, are not entirely satisfactory mainly because the alkyl aluminum derivatives formed in the reaction are sensitive to air and moisture and tend to ignite spontaneously on exposure to the atmosphere. Also, the reaction masses are sticky and troublesome to discharge from the reactor.

Pedrotti and Sandy, in copending application Ser. No. 293,138, filed July 5, 1963, disclose that tetramethyl lead can be manufactured by reacting monosodium-lead alloy with methyl chloride at −20° to 120° C. in the presence of 0.01 to 1.5 moles of ammonia per mole of alloy, 0 to 0.04 mole of water per mole of alloy and 0 to 0.04 mole, per mole of alloy, of a monohydric organic compound of the formula ROH wherein R is a hydrocarbon or oxahydrocarbon radical of 1–18 carbon atoms. They found that ammonia is a very effective catalyst for this reaction, having many advantages over the aluminum-based catalysts of the prior art, that small amounts of water and monohydroxylic organic compound exert a marked cocatalyst effect increasing the rate and/or the specificity of the ammonia-catalyzed methylation reaction, and that they thereby avoid the disadvantages and hazards involved in the use of aluminum based catalysts.

Sandy, in copending application Ser. No. 456,478, filed May 17, 1965, discloses that tetramethyl lead can be manufactured by reacting monosodium-lead alloy with methyl chloride at 25° to 60° C. in the presence of 0.01 to 0.5 mole, per mole of alloy, of ethylenediamine or 2-methoxyethylamine, 0 to 0.1 mole of water per mole of alloy, and 0 to 0.1 mole, per mole of alloy, of a monohydric organic compound of the formula ROH wherein R is a hydrocarbon or oxahydrocarbon radical of 1–18 carbon atoms. He shows that the favorable results obtained with ethylenediamine and 2-methoxyethylamine are not obtained in the case of closely related amines such as 1,2-diaminopropane, ethylamine or 3-methoxypropylamine.

Similarly, Pedrotti, Sandy and Tullio, in copending application Ser. No. 493,927, filed Oct. 7, 1965, disclose that tetramethyl lead can be manufactured by reacting monosodium-lead alloy with methyl chloride at 70° to 130° C. in the presence of 0.05 to 1 mole of methylamine per mole of alloy and 0 to 0.01 mole of water per mole of alloy. They show that the favorable results obtained with methylamine are not obtained with closely related amines such as ethylamine. Still further improvements in the manufacture of tetramethyl lead are desirable.

It is an object of this invention to provide a new and improved process for making tetramethyl lead by the reaction of methyl chloride with monosodium-lead alloy. A particular object is to provide such a process which avoids the use of aluminum type catalysts and the hazards and problems associated therewith. A further object is to provide a process for the manufacture of tetramethyl lead in which the reaction is initiated smoothly and safely at relatively low temperatures and pressures. These and other objects will become apparent from the following description of this invention.

It has now been discovered that the above objects can be accomplished by reacting monosodium-lead alloy with methyl chloride in the liquid phase, at least 1 mole of methyl chloride being present per mole of alloy, in the presence of 0.05 to 1 mole, per mole of alloy, of a hydroxylamine of the formula $RONH_2$ where R is hydrogen or lower alkyl at a temperature of 20° to 120° C.

When the recited hydroxylamines are employed in the specified proportions under the recited conditions, they are highly effective catalysts for the reaction of methyl chloride with monosodium-lead alloy. With these catalysts the methylation is initiated and brought to completion smoothly and rapidly under mild conditions of temperature and pressure to produce good yields of tetramethyl lead. The hydroxylamines do not require a metal catalyst such as magnesium or the aluminum type catalysts and thus their use avoids the hazards of making and handling aluminum type catalysts and the difficulties involved in processing reaction masses produced with those catalysts. Thus, the process of this invention renders the manufacture of tetramethyl lead more safe, practicable and economical.

The presence of a hydroxylamine is essential to the process of this invention. Without it practically no tetramethyl lead is produced. As pointed out in the copending applications cited above, most amines are not effective as catalysts for this reaction. In other words, the hydroxylamines used in the process of this invention, like ammonia (Pedrotti and Sandy, cited above), ethylenediamine and 2-methoxyethylamine (Sandy, cited above), and methylamine (Pedrotti, Sandy and Tullio, cited above) are unique among the nitrogen bases for this reaction. Moreover, these hydroxylamines are much less volatile than ammonia and therefore have less tendency to escape from the reaction zone. They also have the advantage over ammonia, ethylenediamine, 2-methoxyethylamine and methylamine of being less reactive with methyl chloride thereby reducing the amount of side reaction.

The reaction is carried out in the liquid phase with methyl chloride in a proportion of at least about 1 mole per mole of alloy and preferably about 1.3 to 6 moles per mole of alloy. When less than about 1 mole of methyl-chloride is employed, the expensive alloy is not used efficiently. The use of more than about 6 moles of methyl chloride per mole of alloy does not provide any particular benefit and requires higher operating pressures, although larger amounts up to about 20 moles can be used if desired. More preferably, about 1.3 to 3 moles are used in batch processes while about 4 to 6 moles are used in continuous processes.

The reaction should be carried out at temperatures in the range of about 20° to 120° C. At temperatures below about 20° C. the reaction does not generally proceed at a practical rate. Temperatures above about 120° C. should be avoided since they are unnecessary, require high pressure equipment and are potentially hazardous. Preferably temperatures of about 50° to 90° C. are employed. It is necessary that the reaction be carried out under sufficient pressure to maintain the methyl chloride in the liquid phase or under reflux. In general, pressures of about 80 to 550 p.s.i.g., and preferably about 150 to 400 p.s.i.g. are employed.

The hydroxylamines which may be used as catalyst in the process of this invention are those having the formula $RONH_2$ where R is hydrogen or lower alkyl. Typical examples of suitable amines include hydroxylamine and oxygen-substituted hydroxylamines such as methoxyamine, ethoxyamine, propoxyamine, butoxyamine and pentoxyamine. Methoxyamine is the preferred catalyst. The hydroxylamine may be employed in the proportion of about 0.05 to 1 mole per mole of alloy, and preferably about 0.1 to 0.5 mole.

The hydroxylamine catalyst is preferably incorporated into the reaction mass as the free base, but may be added as the acid salt. For example, hydroxylamine, normally not handled as the free base, can be utilized as the hydrochloride, $NH_2OH \cdot HCl$, or sulfate, $(NH_2OH)_2 \cdot H_2SO_4$. Since the acid component of such acid salt is capable of destroying monosodium-lead alloy, it is usually beneficial to employ a sacrificial acid-binding agent, other than the alloy itself, such as the commonly employed alkali metal and alkaline earth metal oxides, carbonates, bicarbonates and carboxylates, to release the free $RONH_2$ in situ. Amine bases stronger than the hydroxylamine catalyst can also be used as the acid-binding agent.

Methanol and methyl iodide have been found to be catalyst promoters for this reaction. They accelerate the methylation reaction and promote the formation of tetramethyl lead at the expense of side reactions. The amount of methanol employed may vary from 0 to about 0.02 mole per mole of alloy. The amount of methyl iodide may vary from 0 to about 0.3 mole per mole of alloy. Preferably at least about 0.004 mole of methanol or about 0.001 to 0.03 mole of methyl iodide is employed per mole of the alloy. The catalyst promoters are especially effective with lower amounts of hydroxylamine catalyst. When the hydroxylamine catalyst is used in the form of its acid salt in combination with an acid-binding agent, the catalyst promoter may conveniently serve as the solvent to assist the acid salt-acid binding agent reaction.

Monosodium-lead alloy containing 50 mole percent Na and 50 mole percent Pb, or on a weight basis 10% Na and 90% Pb, has been amply described in the art. It may be used in various forms, usually comminuted, including ground as disclosed by Stecher in U.S. Patent 2,134,091, flaked as disclosed by Pyk in U.S. Patent 2,561,636 or by Tanner in U.S. Patent 2,633,107, and quenched in methyl chloride as described by Mattison in U.S. Patent 2,744,126.

The methyl chloride may contain rather large proportions of water. In contrast to prior practices regarding the alkylation of monosodium-lead alloy, it is not necessary to exclude or limit moisture to very low levels. For example, in aluminum-catalyzed methylations, it is considered desirable to limit the water content of the methyl chloride to less than 150 parts per million (p.p.m.) or 0.015% by weight and in general to operate as anhydrously as possible. In the process of this invention, substantially greater quantities of water can be tolerated, for example as high as about 500 p.p.m., based on the methyl chloride or about 0.05% by weight. Generally, the total water introduced can be as high as about 0.005 mole/mole of alloy without adverse effect. Usually, the water introduced with the methyl chloride will be in the range of about 50 to 100 p.p.m. based on the methyl chloride and from about 0.0004 to 0.001 mole per mole of alloy. These amounts of water are well within the tolerances of the reaction. This is a commercially important advantage because it is not economically practical to provide completely anhydrous reaction materials.

The overall process of this invention involves the steps of:

(1) Mixing the alloy, methyl chloride, the hydroxylamine and methanol or methyl iodide, (2) Holding such mixture in a closed reaction vessel at a temperature in the range of about 20° to 120° C. at which temperature reaction begins and proceeds at a reasonable rate, and (3) Recovering tetramethyl lead from the reaction mass.

Normally the reaction is agitated, commonly in the presence of an inert solid such as graphite as internal lubricant. About 1–5% by weight based on the alloy may be used, the exact amount depending on the dimensions of the reactor, the efectiveness of the agitation, and the proportions of the reactants. A thermal stabilizer for tetramethyl lead may also be present as described by Jarvie et al. in U.S. Patent 3,048,610 and Cook et al. in U.S. Patent 3,049,558. For example, a volatile hydrocarbon having boiling characteristics comparable to those of tetramethyl lead such as toluene or isooctane, may be used.

The reactants, catalyst, catalyst promoter and other agents as described above may be introduced separately or together, all at once or gradually during the course of the reaction. The catalyst components may be added as such or in a carrier which conveniently may be the methylating agent or an inert solvent including the thermal stabilizer.

The reaction mass components may be mixed at temperatures below those at which the reaction proceeds at a substantial rate, for example below 0° C., and the mixture then brought to operating temperature. Alternatively the reactants and other essential components may be mixed at temperatures within the operating range. The reaction may be conducted batchwise or continuously.

shaking. Reaction was terminated by cooling to −70° C. and the tetramethyl lead was recovered by extracting the reaction mass with toluene.

The data obtained are presented in the following table in which TML represents tetramethyl lead.

TABLE I

| Example | $CH_3-ONH_2$/NaPb mole ratio | Promoter/NaPb mole ratio | TML yield, percent based on alloy | Conversion, percent based on alloy | Reaction specificity, yield/conversion |
|---|---|---|---|---|---|
| 1 | .085 | 0 | 20 | 35 | .58 |
| 2 | .13 | 0 | 34 | 58 | .59 |
| 3 | .17 | 0 | 46 | 71 | .65 |
| 4 | .27 | 0 | 55 | 84 | .65 |
| 5 | .32 | 0 | 49 | 92 | .53 |
| 6 | .13 | .0047 $CH_3OH$ | 41 | 64 | .63 |
| 7 | .13 | .0138 $CH_3OH$ | 47 | 68 | .69 |
| 8 | .32 | .0045 $CH_3OH$ | 53 | 94 | .56 |
| 9 | .33 | .0140 $CH_3OH$ | 53 | 93 | .57 |
| 10 | .088 | .011 $CH_3I$ | 60 | 80 | .75 |
| 11 | .13 | .001 $CH_3I$ | 47 | 65 | .72 |
| 12 | .13 | .004 $CH_3I$ | 54 | 78 | .69 |
| 13 | .13 | .018 $CH_3I$ | 76 | 94 | .81 |
| 14 | .17 | .002 $CH_3I$ | 58 | 85 | .69 |
| 15 | .17 | .004 $CH_3I$ | 64 | 90 | .72 |
| 16 | .17 | .011 $CH_3I$ | 68 | 94 | .73 |
| Control | 0 | 0 | Nil | | |

EXAMPLES 17 AND 18

Example 1 was repeated with hydroxylamine and isopropoxyamine added to the reaction mixture as their hydrochlorides. The following data were obtained.

TABLE II

| Catalyst | Catalyst/NaPb mole ratio | TML yield, percent based on alloy | Conversion, percent based on alloy | Reaction specificity, yield/conversion |
|---|---|---|---|---|
| $HONH_2 \cdot HCl$ | .18 | 11 | 67 | .16 |
| $CH_3CH_2ONH_2 \cdot HCl$<br>\|<br>$CH_3$ | .14 | 18 | 44 | .41 |

An important feature of this invention is that the hydroxylamine catalyst system effects the reaction at moderate temperatures and autogenous pressures, for example at preferably about 50° to 90° C. corresponding to pressures of about 150 to 400 p.s.i.g. Reaction mass temperatures are readily controlled by controlling the amount and schedule of catalyst and methyl chloride addition, by cooling where necessary, and by refluxing methyl chloride to keep the internal pressures at safe levels, for example preferably below about 400 p.s.i.g.

The resulting reaction mass may be worked up in the usual way known to those skilled in the art. Normally, the residual methyl chloride is vented from the reaction vessel at a temperature of about 25° to 60° C. and is passed to a recovery system as in tetraethyl lead technology. For this purpose, the reaction mass temperature is adjusted accordingly. The tetramethyl lead is then recovered by solvent extraction, for example with toluene, or by steam distillation according to the well-known techniques.

The following examples are given to more clearly illustrate the process of this invention, representative modes of practicing it and the advantageous results obtained thereby. All parts and percentages are by weight.

EXAMPLES 1–16

General procedure

A steel bomb was charged with 100 parts of crushed 10 on 20 mesh NaPb enclosed in a glass ampoule and catalyst components as described in Table I below. The bomb was cooled to −70° C., its atmosphere evacuated and 130 parts $CH_3Cl$ were admitted from a pressurized source, corresponding to a loading density of 0.52 gram $CH_3Cl$/cc. of bomb capacity and a $CH_3Cl$/NaPb mole ratio of 5.9. The water content of the reaction medium was 23 p.p.m. based on methyl chloride for a $H_2O$/NaPb mole ratio of 0.0004. At about 0° C. the closed bomb was struck sharply against a solid object to break the ampoule, placed in a preheated oil bath at 50° C. for one hour while its contents were vigorously agitated by The hydrogen chloride introduced with the hydroxy- and isopropoxyamine undoubtedly destroys an equimolar proportion of alloy. This would account for a substantial proportion of the total alloy conversion in each run. On this basis, it is expected that the yield would be materially enhanced on adding hydroxylamine or propoxyamine as the free base or employing an acid binding agent in conjunction with the acid salt to release the free base.

It will be understood that the preceding examples are given for illustrative purposes only, and that this invention is not limited to the specific embodiments described therein. On the other hand, it will be apparent to those skilled in the art that, subject to the limitations set forth in the general description, numerous variations and modifications in the materials, proportions, conditions and procedures employed can be made without departing from the spirit of the invention or the scope of the following claims.

We claim:

1. A process for making tetramethyl lead which comprises reacting monosodium-lead alloy with methyl chloride in the liquid phase, at least 1 mole of methyl chloride being present per mole of alloy, in the presence of 0.05 to 1 mole, per mole of alloy, of a hydroxylamine of the formula $RONH_2$ where R is hydrogen or lower alkyl, at a temperature of 20° to 120° C.

2. The process of claim 1 wherein 1.3 to 6 moles of methyl chloride are present per mole of alloy, 0.1 to 0.5 mole of a hydroxylamine is present per mole of alloy and the temperature is 50° to 90° C.

3. The process of claim 2 wherein the hydroxylamine is hydroxylamine.

4. The process of claim 2 wherein the hydroxylamine is methoxyamine.

5. The process of claim 2 wherein the pressure is 150 to 400 p.s.i.g.

(References on following page)

References Cited

UNITED STATES PATENTS

| | | | |
|---|---|---|---|
| 1,622,228 | 3/1927 | Midgley | 260—437 |
| 2,621,200 | 12/1952 | Kolka | 260—437 |
| 3,281,442 | 10/1966 | Pedrott et al. | 260—437 |

OTHER REFERENCES

Fieser and Fieser: Organic Chemistry, Reinhold Publ. Corp., New York (1956), p. 211.

TOBIAS E. LEVOW, *Primary Examiner.*

H. M. S. SNEED, *Assistant Examiner.*